Oct. 31, 1933.  L. J. BLACK  1,932,685
BRAKE APPLYING MEANS
Filed April 14, 1931   5 Sheets-Sheet 1

Inventor
Lee J. Black

Attorney

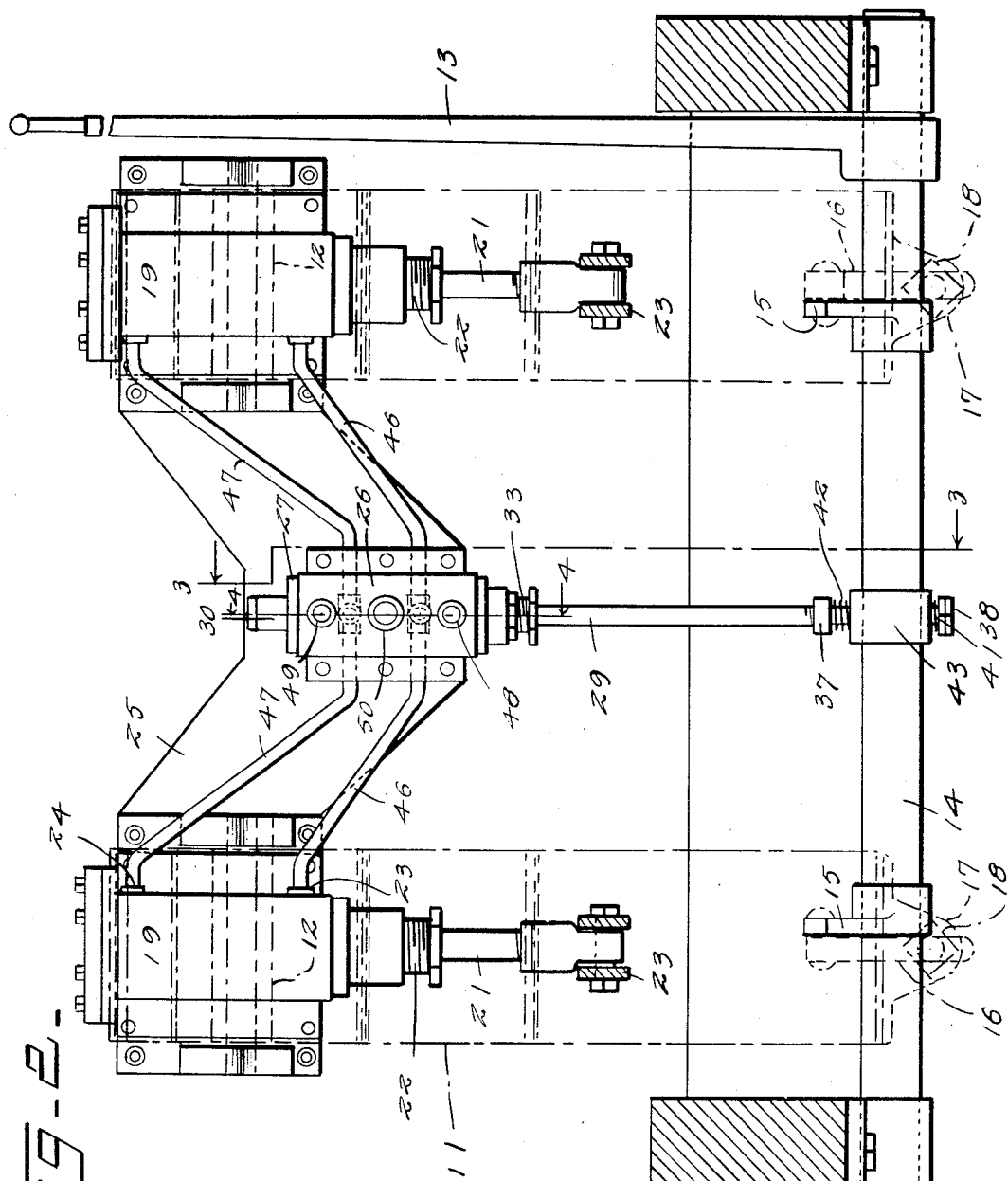

Oct. 31, 1933.  L. J. BLACK  1,932,685
BRAKE APPLYING MEANS
Filed April 14, 1931  5 Sheets-Sheet 3
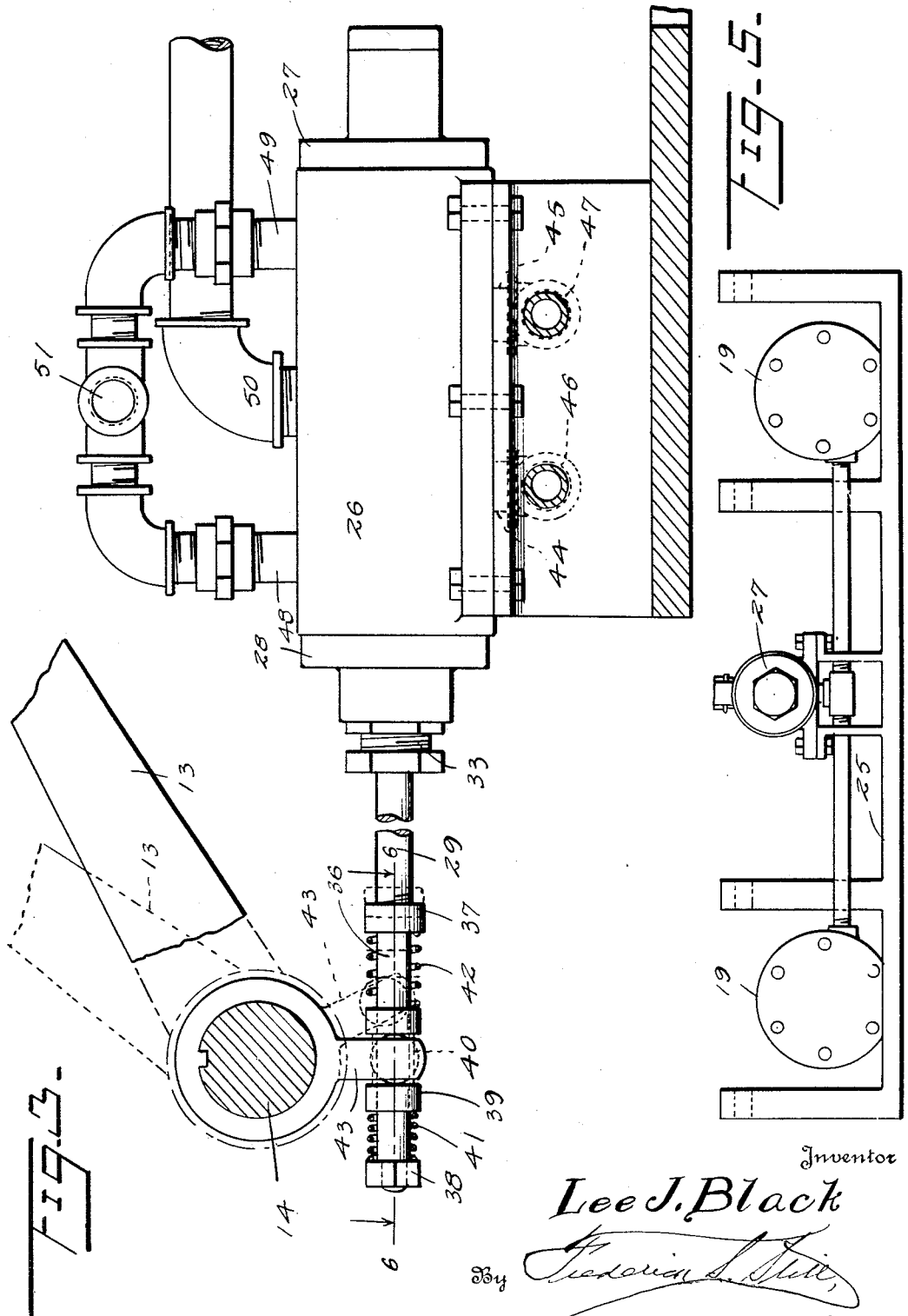
Inventor
Lee J. Black
By Frederick L. Still
Attorney

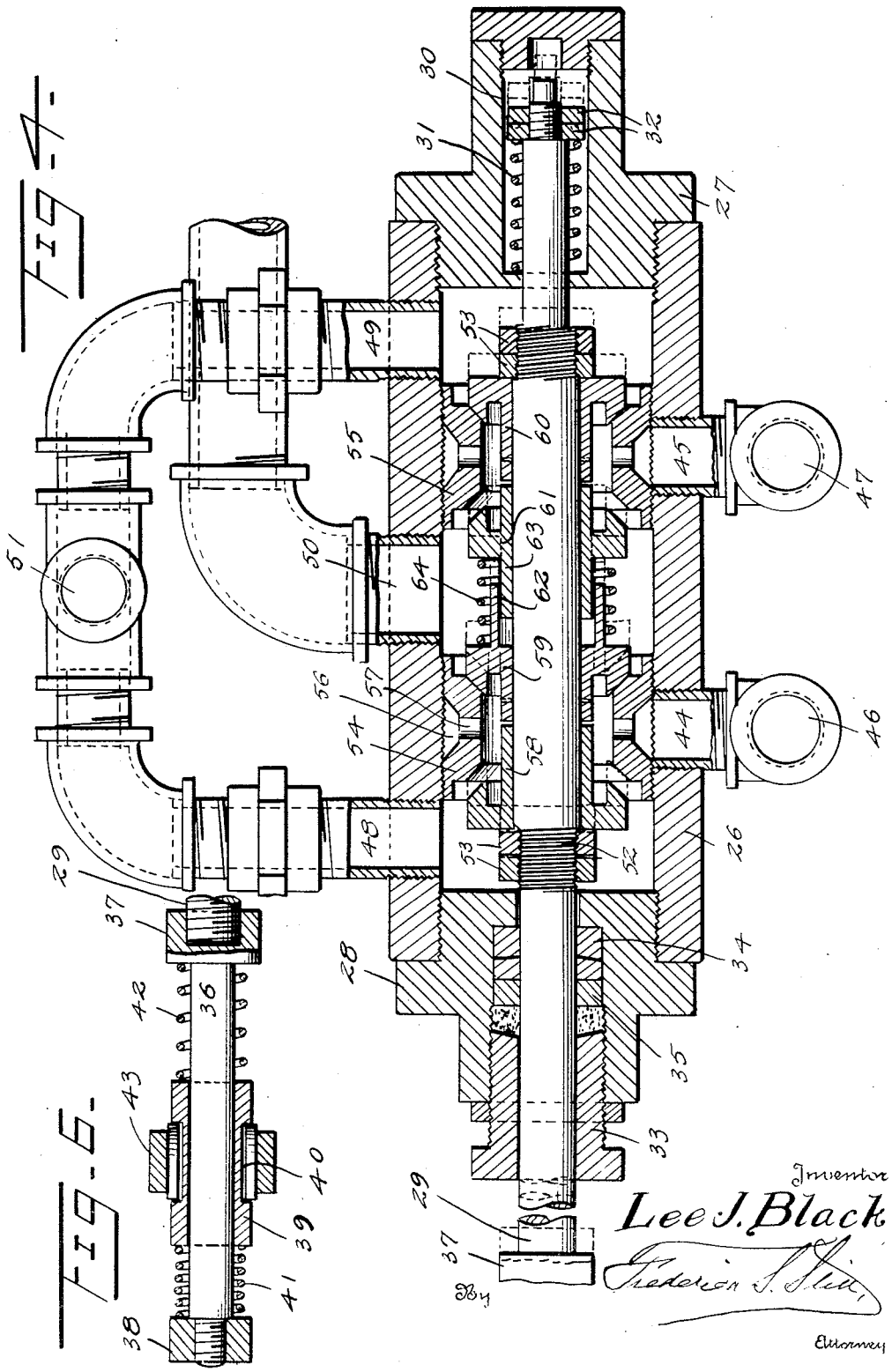

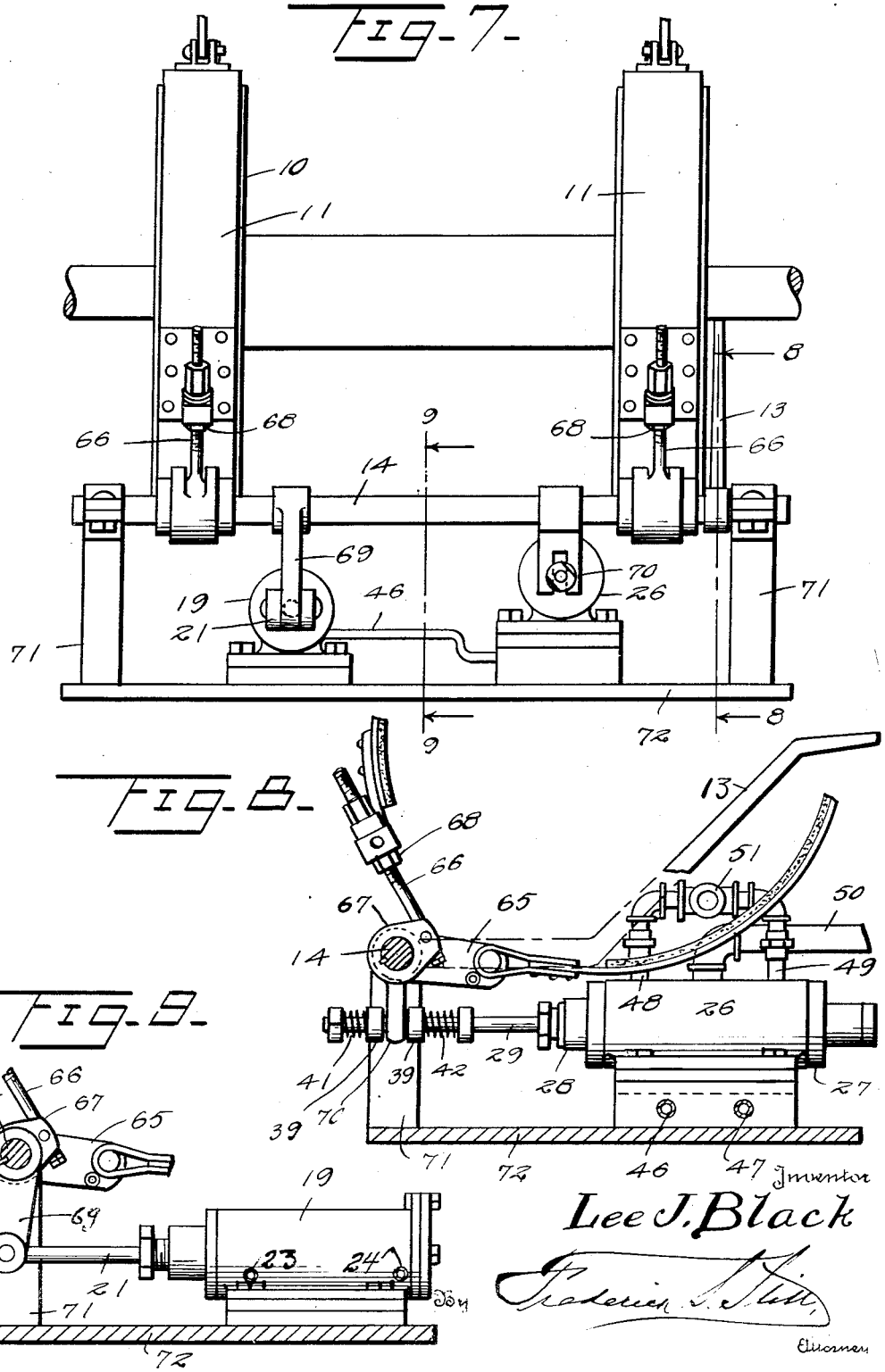

Patented Oct. 31, 1933

1,932,685

UNITED STATES PATENT OFFICE 1,932,685

BRAKE APPPLYING MEANS

Lee J. Black, Beaumont, Tex.

Application April 14, 1931. Serial No. 530,049

15 Claims. (Cl. 188—151)

This invention relates to brakes such as are used on the draw works of well drilling apparatus and in other situations and particularly to those brakes in which a band is used, the band being tightened upon the brake drum by means of a hand lever.

In rotary well drilling, the loads on the brake flanges or drums of the draw works are extremely heavy, frequently reaching 250,000 lbs. and these loads are constantly increasing with increasing depths of drilling and the increasing weight of the pipe used. The diameter of the brake drums must be limited because of the area in which the hoisting apparatus must be installed and the width of the brake bands must be limited because of the same condition. This weight on the hoisting drum is at present controlled entirely by hand levers and it is frequently necessary to employ two levers or two men on a lever to hold a load. This is especially true during wet weather when the operations are being carried on on the outside as they usually are.

The general object of the present invention, therefore, is to provide supplementary power operated means for applying additional power to the brake to contract it on the drum and particularly to use a fluid pressure means for this purpose acting on the brake band and preferably acting on the brake band after the hand lever has been shifted to a brake applying position and then acting to apply power to the brake band to further contract it around the brake.

A further object is to provide mechanism of this character by which the brake may first be applied by hand, then upon a further depression of the brake lever will apply power to contract the brake band and upon a release of the brake lever will first release the power applying mechanism.

A further object is to provide a mechanism of this character operating under fluid pressure and so constructed that it is only necessary to move the handle of the lever four to six inches to cause a corresponding movement of the valve controlling the application of fluid pressure to the brake band, thus permitting the operator to always have his brake band tension applied by the hand mechanism before the fluid cylinders come in action to increase the pressure of the brake band on the brake flange and further to permit a relatively short movement of the lever to release the fluid pressure on the band, without, however, releasing the hand exerted pressure, allowing the operator to feed down the load, yet keeping the brake band under close regulated pressure.

Another object is to provide a mechanism of this character so constructed that if the operator does not desire to use the fluid pressure, he may simply shut off the supply valve and drain the fluid from his hydraulic cylinders or when abnormal conditions arise, the operator has only to open the fluid inlet valve and close the drain cocks on the hydraulic cylinders.

Other objects will appear in the course of the following description.

My invention is illustrated in the accompanying drawings, wherein:—

Figure 2 is a fragmentary top plan view of the auxiliary means for operating the brake band, the standards of the derrick being shown in section;

Figure 3 is a section on the line 3—3 of Figure 2;

Figure 4 is a longitudinal sectional view through the controlling valve on the line 4—4 of Figure 2;

Figure 5 is a rear end elevation of the auxiliary controlling means;

Figure 6 is a sectional view on the line 6—6 of Figure 3.

Figure 7 is a rear fragmentary elevation of a pair of brake drums with brakes thereon and showing a modification of the means for operating the brakes;

Figure 8 is a section on the line 8—8 of Figure 7;

Figure 9 is a section on the line 9—9 of Figure 7.

Figure 1:
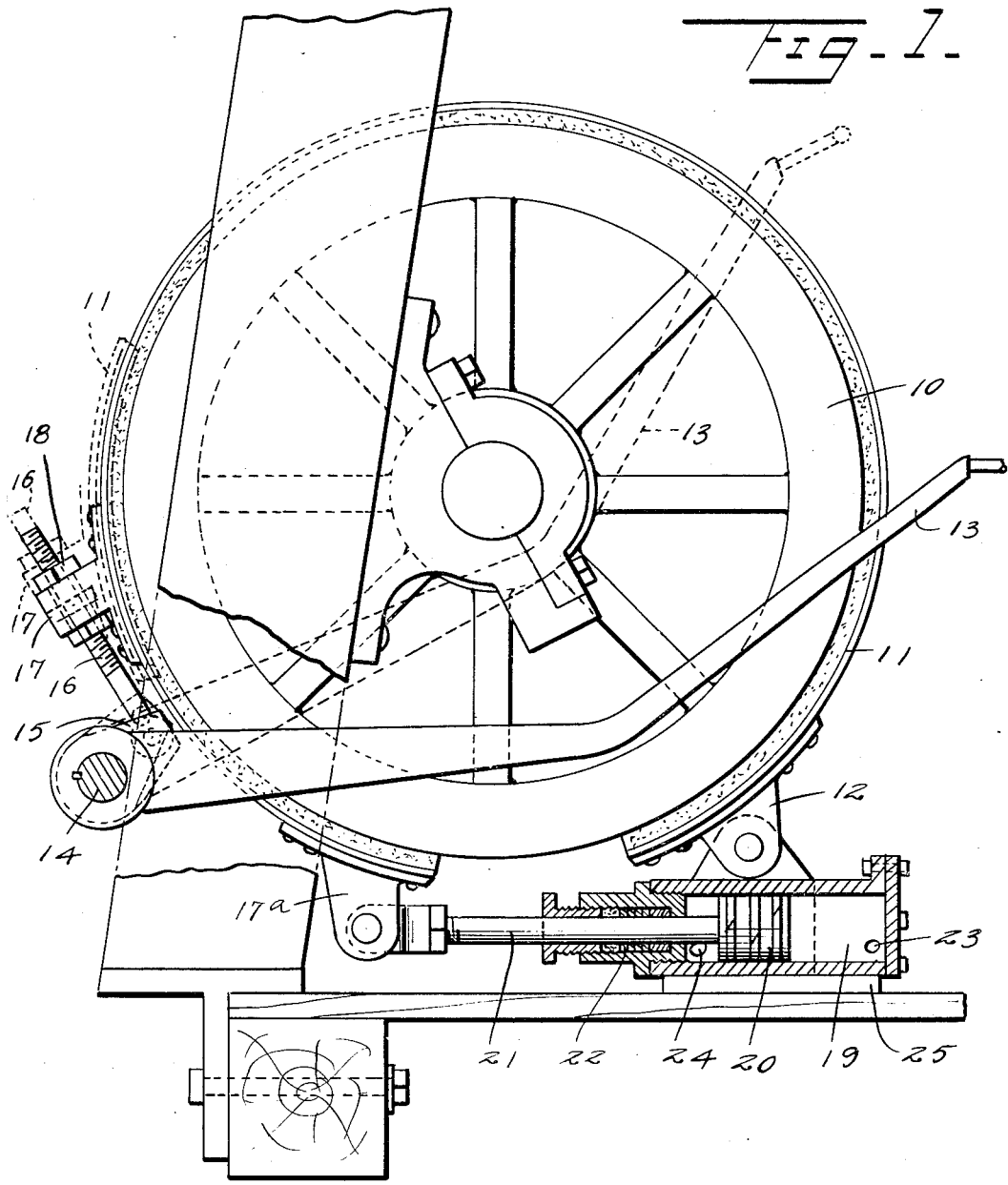
Figure 1 is a side elevation of a brake drum and brake, the cylinder of the fluid operated brake means being shown in section.
Figure 1:
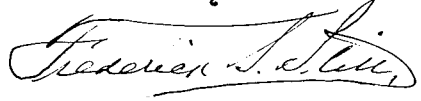

Referring to these drawings, 10 designates the usual brake drum of the brake flange on a winding drum and 11 the usual brake band. One end of this band is anchored as at 12. The brake lever whereby the brake is applied or released by hand is designated 13. This is mounted upon a shaft 14, which shaft is provided with the usual arm 15 connected by a bolt 16 to a lug 17 riveted to the brake band and through which the bolt 16 passes, this bolt carrying the opposed nuts 18 bearing against opposite ends of the sleeve lug. It is particularly noted that this lug 17 is applied to the brake band not at its extremity but at a distance from the free extremity of the brake band. Except for this fact, what is illustrated is the ordinary and normal set-up.

For the purpose of applying supplementary power to the brake band at the will of the operator and in order to still further contract it around the brake drum or flange, I provide a cylinder 19 having therein a piston 20 and piston rod 21 extending out through a stuffing box gland 22 at one end of the cylinder. This piston rod at its extremity is pivotally connected to a lug 17a riveted or otherwise attached to the free end of the brake band. It will be, obvious, therefore, that when the piston is moved in one direction, the band will be contracted and in the other direction will be released. The cylinder 19 has two ports 23 and 24 disposed adjacent its opposite ends and whereby fluid pressure may be used to force the piston in one direction or the other. The admission of this fluid pressure to the piston is secured by a valve which will be later described.

The cylinder 19 is mounted upon a base 25 which is securely anchored to the derrick structure. While I have heretofore referred to a single cylinder 19, it is to be understood that preferably there are two of these cylinders 19 disposed in spaced relation to each other. These cylinders may be connected each to a separate brake band and, of course, the shaft 14 is operatively connected to the two separate brake bands, the lever 13 being applied to this shaft.

The means for admitting fluid pressure to the interior of the cylinders 19 and releasing the fluid pressure therefrom is illustrated in Figure 4 and is as follows:—

A cylinder 26 is closed at its opposite ends by the heads 27 and 28 having screw-threaded engagement with the ends of the cylinders. Operating through the cylinder and through the head 28 is a valve operating rod 29.

The head 27 is formed at its rear end with a chamber 30. Disposed within this chamber is the coiled compression spring 31 bearing against nuts 32 having screw-threaded engagement with the extremity of the rod 29. Thus this spring 31 acts to force the rod 29 toward the right in Figure 4. The opposite end of the rod passes through the head 28 and particularly through the stuffing box formed of the gland 33, packing and junk rings 35.

Forming an extension of the rod 29 and having screw-threaded engagement therewith is a member 36 shouldered at one end as at 37 and screw-threaded for engagement at its other end with the nuts 38. The reduced portion of this member which, as before stated, constitutes an extension of the rod 29 and will hereafter be termed the rod, passes through a sleeve 39 which is slidable upon the rod 36 and has an annular recess 40.

Surrounding the rod 36 at one end is the coiled compression spring 41 which bears against one end of the sleeve and surrounding the rod 36 at the other end is a coiled compression spring 42 which bears against the other end of the cylinder. The eye of the lever 13 which surrounds the shaft 14 is formed with the outwardly projecting arm or lug 43 which is forked to partially embrace the sleeve 39 and to be disposed within the recess 40. Thus it will be seen that as the brake lever or handle 13 is forced downward, the spring 41 will be compressed and then the rod 29 will be forced in one direction and that upon a movement of the brake handle or lever to a release position, the spring 42 will be compressed and then the valve rod 39 with its extension 36 will be shifted in the other direction.

The cylinder is provided with two ports 44 and 45 connected to the two ports 23 and 24 of the cylinders 19 by ducts 46 and 47. The cylinder is also provided with two inlet ports 48 and 49 and a fluid outlet port 50. The ports 48 and 49 are both connected by a common connection 51 to a source of fluid pressure. The port 50 may be connected to any suitable outlet for the fluid pressure. This fluid may be either air, oil or water. The rod 29 is a valve rod and carries upon it valves which, as the rod is shifted, permit the inlet of fluid pressure to one end or the other of the cylinders 19 and permit the outlet of fluid pressure from the other end of the cylinders 19. To this end, the rod 29 adjacent opposite ends of the cylinder 26 is screw-threaded at 52 and engaging these screw-threads are the nuts. Having engagement with the interior screw-threads upon the cylinder are the annular valve seats 54 and 55. Each of these is formed to provide an annular duct 56 opening into the port 44 or into the port 45, there being ports 57 opening from the inner face of each valve into this annular duct 56. These seats have inclined faces. Coacting with the seat 54 is an annular piston valve formed in two sections 58 and 59 having faces adapted to alternately engage against the inclined faces of the seats 54. When the piston valve formed of the sections 58 and 59 is shifted to the left in Figure 4, communication will be established between the inlet port 58 and the chamber 56 of the valve seat 54 and fluid pressure will be allowed to flow to the port 44 and the ducts 46. When rod 29 is shifted to the right in Figure 4, however, the left hand end of the valve section 58 will seat against the seat 54 while the right hand section of the valve 59 will be shifted away from the seat, thus establishing communication between the duct 46 and the port 44 and the outlet port 50.

The opposite end of the valve rod 29 also carries upon it the sectional piston valve formed of the two sections 60 and 61, this piston valve coacting with the seat 55 in the same manner as the first named piston valve coacts with the seat 54 except that when the valve rod 29 is shifted to the left, communication is established between the port 45 and the outlet port 50. Thus it will be seen that when the valve rod is shifted in one direction, communication will be established between the source of pressure and one end of the cylinder 19 and between the other end of the cylinder 19 and the outlet port 50 and that when the valve rod 29 is shifted in the opposite direction, the last named end of the cylinder 19 will be connected to the source of fluid pressure and the first named end of the cylinder 19 will be connected to the exhaust. The sections 59 and 61 of the two valves are slidably mounted on rod 29 and are formed with overlapping annular portions 62 and 63 sliding upon each other and disposed between these two sections and surrounding these overlapping portions is the compression spring 64 which urges these two sections away from each other and toward their respective valve seats. It will thus be seen that these two sections 59 and 61 have relative movement with relation to each other but that they are urged apart by the spring 64. It is to be noted from Figure 4 that the hub portion of valve 61 is extended laterally so as to abut against the corresponding hub portion of valve 60 and the hub portion of valve 59 abuts against the hub portion of the valve 58. This construction prevents both of these valves moving in unison. In other words, in the position of the valves shown in Figure 4, the hub on valve 60 extends through and abuts against the hub on valve 61 so that regardless of the action of valve 59 which slides over the valve 61, no movement of valve 61 can take place toward its closing position. The object of this construction is that around wells being drilled, the steam and fluid pressures are usually high from 200 to 350 lbs. per square inch. This is decidedly more pressure than is necessary or wanted upon the fluid cylinders to contract the brakes, about 90 lbs. of pressure being sufficient. Therefore, referring again to Figure 4, if fluid pressure was entering through valve 69 at say 300 lbs. pressure, then when the accumulated pressure on port 46 had reached the point to cause all the braking action necessary, the spring 64 carries just sufficient tension to produce this pressure. Then the fluid pressure would automatically exhaust around valve 59 sufficiently to relieve the excessive pressure. In other words, this combination somewhat produces a relief valve and a pressure reducing valve, maintaining sufficient pressure because of the tension on the spring 64 to operate the piston in the brake cylinder but it will not allow the full pressure to reach the cylinder.

It is to be particularly noted that when the brake lever 13 is depressed, the rod 29 will be moved to the left in Figure 4 and this will compress the spring 31. This is the position illustrated in Figure 4. This movement will also compress the spring 41. Upon a release movement of the lever 13, however, the spring 41 will expand as will the spring 31 and these two springs, therefore, will act to urge the rod 29 into a position to cut off the passage of fluid to the forward end of the cylinder 19 through a port 24.

The operation of the valve mechanism is as follows:—

The yoke or arm 43 bears such relation to the length of the lever 13 that for each foot that the lever travels at its upper or handle end, the yoke or arm 43 will move three-fourths of an inch, moving the cross head or sleeve 39 a like distance. Therefore, for each movement of the lever of four inches from a position where the lever 13 is applied and up toward the release position, the cross head or sleeve 40 will move about one-quarter of an inch and this movement is sufficient to reverse the valves in the valve casing or cylinder 26. This action is controlled entirely by the tension that is put upon the spring 31, which tension may be controlled by adjusting nuts 32 and I have found that it is only necessary to move the handle of the lever from four inches to six inches in order to cause a corresponding movement of the valves. This is a very desirable feature because the operator always has his brake band tensioned under control by the hand lever 13 before the fluid cylinders come into action and increase the pressure of the brake band or the brake flange. Furthermore the short movement of the lever necessary to release the fluid pressure on the brake band allows the operator to manipulate the brake lever by hand to feed down the load, yet permits him to keep the brake band under close regulated pressure.

The spring 64 normally takes care of any misadjustment and causes the discharge ends of the valves to seat when the inlet ends of the valves are placed in corresponding position.

This secures a positive seating action for these valves and yet allows a certain play or flexibility of movement and furthermore does away with the necessity of absolute exactness and accuracy in the position of the seats 54 and 55 and absolute accuracy in placing the inlet and outlet ends of the valves apart, this play between the valves caused by the fact that the valves are made in sections and furthermore held apart by the springs 64 causing the valves to adjust themselves to the seats. The spring 31 and the springs 41 and 42 act to secure a very quick action of this valve mechanism.

The general operation of the mechanism will be obvious from what has gone before. The operator, when he desires to hold the drum, moves the brake lever 13 downward, gradually contracting the brake band. When the brake lever has been shifted a predetermined amount, however, the spring 41 will become sufficiently compressed as to cause a movement of the rod 29 and shift the valves to the position shown in Figure 4, permitting the inlet of fluid through the port 24 to the interior of the cylinder 19 and causing the rearward movement of the piston 20, which thus will exert a pull upon the brake band and apply a supplementary force upon the brake band which will practically take care of the heaviest loads which may be required to be resisted by the brake band. Upon a reverse movement of the lever and before the brake band has been fully retracted, the first action is to shift the valves within the cylinder 26 to a reverse position, permitting the inlet of fluid through the port 23 behind the piston 20 and permitting the outlet of fluid through the port 24 in front of the piston 20, thus entirely releasing the power operated means and leaving the brake band entirely under the control of the operator.

It is to be particularly noted that in my construction the application of the hydraulic or other fluid pressure does not take place until the brake band is tight upon the drum and simply acts to increase the braking pressure or apply additional pressure after the full pressure of the hand lever had been applied.

In Figures 7, 8 and 9, I have shown a slightly different application of the same mechanism to control the operation of a brake or brakes. In these figures, 10 designates the brake drums and 11 the brake bands, 14 indicating the brake shaft and 13 the lever for operating the shaft and applying or releasing the brakes. In the form of the invention illustrated in these figures, one end of the brake band is anchored as at 65 or anchored in any other suitable manner. The free end of the brake is connected by the screw-threaded link rod 66 to an arm 67 mounted upon the shaft 14 and oscillatable with this shaft. Therefore, when the shaft 14 is turned in a clockwise direction in Figure 2 by means of the lever 13 or by means hereafter described, the brake will be applied and when the shaft 14 is turned in a counterclockwise direction, the brake will be released. The link rod 66 is provided with the usual nuts 68 whereby the connection of the rod to the brake band may be adjusted. Also mounted upon the brake shaft 14 is an arm 69 which, as shown in Figure 9, is pivotally connected to the extremity of the piston rod 21, which piston rod operates within the cylinder 19 as heretofore described. Also mounted upon the shaft 14 as illustrated in Figure 8, is a cleft arm 70 corresponding to the arm 43 shown in Figure 3 and engaging the valve rod 29 in the same manner that the arm 43 engages the valve rod, that is, this valve rod is provided with the opposed shoulders 39 with the springs 41 and 42, the terminal nut 38 and the collar 37. The rod 29 operates within the valve chest or chamber 26 as illustrated in Figure 4. The connections from the valve chamber 26 to the source of fluid pressure and the connections from this valve chamber 26 to the cylinder 19 are the same as heretofore described, that is, the ports 46 and 47 are connected respectively to the ports 23 and 24 of the cylinder 19. It is to be understood that the valve construction is precisely the same as that shown in Figure 4 and that the operating cylinder piston is precisely the same as that shown in Figure 1. Hence it follows that when the operator depresses, the handle 13 of the brake, he will operate the valve mechanism shown in Figure 4 to cause fluid pressure to pass into the rear end of the cylinder 19 to thus cause the piston 21 to move forward and rotate the shaft 14 in a direction to apply additional pressure to the brakes and when the operator moves the brake lever 13 in a reverse direction, the valve within the valve casing 26 will be shifted to cause fluid pressure to enter into the front end of the cylinder 19, thus assisting in releasing the brake by means of the fluid pressure and also acting to hold the brake lever in the released position. In this construction also both brake bands are fully contracted by power after they have been partially applied by hand. In this construction also the rearward movement of the piston rod 21 when the brake is released acts to lift up on the brake lever 13. This assists the operator in holding the lever up in the release position.

This is also true of the construction shown in Figures 1 and 4 as in this construction also upon a reverse movement of the brake lever toward a release position, fluid pressure is admitted behind the piston to cause the piston 20 to move in a direction which will release the brake and thus the movement of the brake band acts through the link 16 to rotate the shaft 14 in a direction to lift up on the brake lever. This is a very important function of the constructions shown in Figures 1 to 6 and 7 to 9 as under the present system of hand braking, the operator is compelled to hold the brake lever up when the brake is released and it being very heavy, it is rather tiresome when running a long string of pipe. Thus in both these constructions, I provide additional force for the support of the brake lever in its up or released position.

In Figures 7 and 8, it will be noted that the brake shaft 14 is supported in bearings 71 which are mounted upon a supporting plate or floor plate 72 and the valve chest 26 and the cylinder 19 are also both mounted upon this floor plate. Thus I provide a self contained unit which includes the brake shaft, the connections from the brake shaft to the cylinders 19 and 26, the cylinder and the operating valve and the brake lever. As shown also in these figures the brake bands are part of this unit, the anchored ends of the brake bands being connected by the anchoring link 65 to the shaft 14, thus doing away with the post type of construction illustrated in Figure 1. Thus this braking arrangement can be installed as a unit or removed as a unit.

It will be seen that in both the constructions which I have illustrated, the brake lever will, in each case, first tighten the band and then the fluid pressure is applied. Thus in the construction shown in Figures 7 to 9, the live end of the band is fastened to arm 67 keyed to the shaft, while piston 21 is applied to an arm keyed on the same shaft. Therefore, there can be no movement of the shaft without first tightening the band during the period of time that the valve is being opened for the passage of fluid and thus when the piston rod 21 moves in the forward direction, that is, to the left in Figure 9, it will continue to supply pressure.

When the brake lever 13 is fully depressed, the fluid pressure remains in the fluid cylinders in either of my constructions to hold the brake band compressed and when the lever is reversed and raised, the fluid pressure acts on the opposite end of the cylinders to hold the brake band in a released position.

While I have illustrated in Figure 9 the arm 69 as extending downward and, therefore reverse the positions of the ports 23 and 24 in Figure 9 from the position of these ports in Figure 1, yet it will be understood that this position of the arm might be varied according to the circumstances.

While I have illustrated, and prefer to use, a fluid pressure operated mechanism for applying this additional contraction of the brake band and additional pressure upon the brake drum, yet I do not wish to be limited to this except as defined in the appended claims as other power operated means (as distinguished from hand-operated) controlled by the hand lever might be used. In one sense, it will be seen that I have provided a motor formed of the cylinder 19 and the piston 20 and thus have provided motor operated means thrown into action by the hand lever in applying the brake which will act to further tighten the brake.

Obviously many of the details of construction may be changed without departing from the spirit of the invention as defined in the appended claims and the same is true of the arrangement of the parts. The same principle of operation may be applied to the application of one brake band or more.

I have used the term brake drum in the specification and claims to indicate any circular or cylindrical member or element which is engaged by a brake band, whether the band is engaged with the drum proper or with the flange on the drum.

I claim:—

1. In a braking mechanism, a brake drum, a brake band anchored at one end, hand operated means for tightening the band on the drum and engaging the band at a point distanced from the free end of the band, reversible power operated means engaging the free end of the band and means for automatically actuating the power actuated means when the brake band has been tightened to a predetermined degree by the hand operated means, the power operated means being reversed upon an initial shifting of the hand operated means toward its release position.

2. In a braking mechanism, a brake drum, a brake band engaging the drum and anchored at one end, hand operated means for tightening the band on the drum and operatively engaging the band at a point between the anchored end of the band and the free end thereof, and reversible power operated means engaging the free end of the band and operable in one direction to place additional contractile strain upon the band and operable in the other direction to relieve said additional contractile strain.

3. In a braking mechanism, a brake drum, a brake band anchored at one end, a brake lever operatively connected to the band adjacent to but spaced from its free end, and fluid pressure operated means controlled by the lever and connected to the free end of the band and put into operation by the final movement of the brake lever toward a brake applying position whereby additional contractile strain may be placed upon the band.

4. In a braking mechanism, a brake drum, a brake band anchored at one end, a brake lever operatively connected to the band adjacent to but spaced from its free end, and reversible fluid pressure operated means connected to the free end of the band whereby additional contractile strain may be placed upon the band, said fluid pressure operated mechanism being automatically operated to increase the strain on the band upon a predetermined movement of the lever toward a full braking position and upon a reverse movement of the lever from a full braking position toward a brake release position acting to reverse the operation of the fluid pressure operated means.

5. In a braking mechanism, a brake drum, a brake band, a lever operatively engaged with the band to tighten it, and means for exerting additional contractile strain on the band including a cylinder, a piston moving therein, one end of the piston being connected to the brake band, the cylinder having ports on each side of the piston and valve mechanism controlled by the brake lever and controlling the admission of motive fluid to the cylinder, the valve mechanism being shifted to permit the inlet of motive fluid in front of the piston upon a final movement of the lever to a full braking position and being shifted to exhaust motive fluid from in front of the piston and permit the inlet of fluid behind the piston upon an initial movement of the lever from its full braking position.

6. In a braking mechanism, a brake drum, a brake band therefor anchored at one end, a hand lever operatively connected to the brake band adjacent its free end and spaced therefrom, a cylinder, a piston therein operatively engaging the free end of the brake band, the cylinder having ports at its opposite ends, a valve casing having ports leading to the ports of the cylinder and having an inlet port and a reciprocating valve mechanism therein operatively connected to the lever and communicatively connecting the inlet of the valve casing to the port in the cylinder in advance of the piston to thereby cause a retraction of the piston and a retraction of the brake band when the hand lever has been shifted nearly to a brake applying position, the valve mechanism in this position connecting the rear of the cylinder with the exhaust ports of the valve casing, the connection between the operating lever and the valve being such that upon an initial reverse movement of the lever to release the brake, the valve mechanism will be shifted to connect the port in advance of the piston with the exhaust port of the valve casing and the port behind the piston with the source of fluid.

7. In a braking mechanism, a brake drum, a brake band therefor anchored at one end, a hand lever operatively connected to the brake band adjacent its free end and spaced therefrom, a cylinder, a piston therein operatively engaging the free end of the brake band, the cylinder having ports at its opposite ends, a valve casing having ports leading to the ports of the cylinder and having an inlet port and reciprocating valve mechanism therein operatively connected to the lever and communicatively connecting the inlet of the valve casing to the port in the cylinder in advance of the piston to thereby cause a retraction of the piston and a retraction of the brake band when the hand lever has been shifted nearly to a brake applying position, the valve mechanism in this position connecting the rear of the cylinder with the exhaust ports of the valve casing, the connection between the operating lever and the valve being such that upon an initial reverse movement of the lever to release the brake, the valve mechanism will be shifted to connect the port in advance of the piston with the exhaust port of the valve casing and the port behind the piston with the source of fluid, and resilient means urging the valve to the last named position.

8. In a braking mechanism, a brake drum, a brake band therefor anchored at one end, a brake lever operatively connected to the brake band adjacent to but spaced from its free end, a cylinder, a piston operating therein and operatively connected to the free end of the brake band, the cylinder having a port at each end thereof, a valve mechanism for controlling the inlet or outlet of motive fluid to or from the cylinder comprising a valve casing having an inlet port and an exhaust port and having ports operatively connected to the ports of the cylinder, a reciprocating valve therein adapted in one position to connect the forward port of the cylinder with the inlet of the valve casing and the rear of the cylinder with the outlet of the valve casing, and in another position to connect the rear of the cylinder with the valve casing inlet and the forward end of the cylinder with the exhaust port, the lever at its pivotal end having a radial arm projecting from it having sliding engagement with said valve, opposed springs on the valve operatively bearing against said arm whereby the lever may have a predetermined motion in either direction before operating the valve whereby the valve will be operated to cause the power application of the brake upon the last part of the movement of the lever and will be shifted to release the power application of the brake upon the initial movement of the lever from its braking position.

9. In a braking mechanism, a brake drum, a brake band therefor anchored at one end, a brake lever operatively connected to the brake band adjacent to but spaced from its free end, a cylinder, a piston operating therein and operatively connected to the free end of the brake band, the cylinder having a port at each end thereof, a valve mechanism for controlling the inlet or outlet of motive fluid to or from the cylinder comprising a valve casing having an inlet port and an exhaust port and having ports operatively connected to the ports of the cylinder, a reciprocating valve therein adapted in one position to connect the forward port of the cylinder with the inlet of the valve casing and the rear of the cylinder with the outlet of the valve casing, and in another position to connect the rear of the cylinder with the valve casing inlet and the forward end of the cylinder with the exhaust port, the lever at its pivotal end having a radial arm projecting from it having sliding engagement with said valve, opposed springs on the valve operatively bearing against said arm whereby the lever may have a predetermined motion in either direction before operating the valve whereby the valve will be operated to cause the power application of the brake upon the last part of the movement of the lever and will be shifted to release the power application of the brake upon the initial movement of the lever from its braking position, and a spring operatively engaging the valve and urging it to its release position.

10. In a braking mechanism, a brake drum, a brake band therefor anchored at one end, a brake lever operatively connected to the brake band adjacent to but spaced from its free end, a cylinder, a piston operating therein and operatively connected to the free end of the brake band, the cylinder having a port at each end thereof, a valve mechanism for controlling the inlet or outlet of motive fluid to or from the cylinder comprising a valve casing having an inlet port and an exhaust port and having ports operatively connected to the ports of the cylinder, a valve rod extending through the cylinder, a pair of annular valve seats disposed within the cylinder, the exhaust port being disposed between said valve seats, the inlet ports being disposed in opposite ends of the cylinder, each of said valve seats being formed to define an annular chamber having a port leading to the exterior of the valve seat at its middle, the ports leading to the cylinder ports being disposed immediately opposite the chambers defined by said valve seats, and valves carried by said rod and reciprocating therewith and coacting with each valve seat, the valves having opposed portions which when the valve rod is shifted in one direction establish communication between one of said inlet ports and the interior of one of said valve seats and cut off communication between the interior of the same valve seat and the exhaust port and simultaneously establish communication between the interior of the other valve seat and the exhaust port and cut off communication between the other inlet port and the interior of the valve seat, and in the opposite position of the rod reverse the position of the valves, and means connected to the lever for shifting said rod, said means including a member having sliding engagement with the rod, and springs carried by the rod and operatively bearing against each face of the member whereby the lever may shift a predetermined distance to apply the brake before actuating the valve in one direction and upon a movement in the reverse direction will initially shift the valve before the brake lever has moved to a position to entirely release the brake.

11. In a braking mechanism, a brake drum, a brake band therefor anchored at one end, a brake lever operatively connected to the brake band adjacent to but spaced from its free end, a cylinder, a piston operating therein and operatively connected to the free end of the brake band, the cylinder having a port at each end thereof, a valve mechanism for controlling the inlet or outlet of motive fluid to or from the cylinder comprising a valve casing having an inlet port and an exhaust port and having ports operatively connected to the ports of the cylinder, a valve rod extending through the cylinder, a pair of annular valve seats disposed within the cylinder, the exhaust port being disposed between said valve seats, the inlet ports being disposed in opposite ends of the cylinder, each of said valve seats being formed to define an annular chamber having a port leading to the exterior of the valve seat at its middle, the ports leading to the cylinder ports being disposed immediately opposite the chambers defined by said valve seats, and valves carried by said rod and reciprocating therewith and coacting with each valve seat, the valves having opposed portions which when the valve rod is shifted in one direction establish communication between one of said inlet ports and the interior of one of said valve seats and cut off communication between the interior of the same valve seat and the exhaust port and simultaneously establish communication between the interior of the other valve seat and the exhaust port and cut off communication between the other inlet port and the interior of the valve seat, and in the opposite position of the rod reverse the position of the valves, each valve being formed of two sections abutting against each other, the adjacent sections of the two valves having overlapping engagement with each other, and a spring urging said sections apart, and means connected to the lever for shifting said rod, said means including a member having sliding engagement with the rod and springs carried by the rod and operatively bearing against each face of the member whereby the lever may shift a predetermined distance to apply the brake before actuating the valve in one direction and upon a movement in the reverse direction will initially shift the valve before the brake lever has moved to a position to entirely release the brake.

12. In a braking mechanism, two drums, two brake bands embracing the drums, each brake band being anchored, a shaft operatively connected to the brake bands adjacent to but spaced from their free ends, a hand lever mounted upon the shaft whereby the brake bands may be contracted upon the drum, and power operated means connected to the free end of each brake band for exerting additional strain upon the brake band, and means for automatically throwing said power actuated means into action when the brake lever has shifted nearly to its full braking position and for throwing said power actuated means out of action and releasing it automatically when the brake lever is initially shifted away from its full braking position and toward its release position.

13. In a braking mechanism, a brake drum, a brake band coacting therewith, hand operated means for tightening the band on the drum, and fluid pressure operated means for exerting a lifting force upon the hand operated means to shift it toward a fully released position and operating after the hand operated means has been initially shifted toward a release position.

14. In a braking mechanism, a brake drum, a brake band, a brake shaft operatively engaged with the band to tighten it upon a rotation of the shaft in one direction, a brake lever attached to said shaft for rotating it, a cylinder, a piston moving therein, one end of the piston being operatively connected to the shaft, the cylinder having ports on each side of the piston, a valve mechanism controlling the admission of motive fluid to opposite ends of the cylinder and means for shifting the valve mechanism, said means including a shiftable member, and an arm projecting from the brake shaft and engaging said shiftable member.

15. In a braking mechanism, a brake rim, a brake band, a brake shaft, a manually operated brake lever operatively connected to the shaft for oscillating the same and tightening the band on the drum, and power operated means directly connected to the shaft and placed in action automatically when the brake lever is moved toward the tightening position to further assist in the tightening of the brake band, said power operated means automatically holding the tension on the brake band until the braking lever is moved a predetermined distance toward its released position.

LEE J. BLACK.